(12) United States Patent
Rolland et al.

(10) Patent No.: US 7,943,699 B2
(45) Date of Patent: May 17, 2011

(54) ETHYLENE COPOLYMER MODIFIED ORIENTED POLYESTER FILMS, TAPES, FIBERS AND NONWOVEN TEXTILES

(75) Inventors: Loic Pierre Rolland, Divonne les Bains (FR); Sam Louis Samuels, Landenberg, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 1437 days.

(21) Appl. No.: 10/969,505

(22) Filed: Oct. 20, 2004

(65) Prior Publication Data

US 2005/0112372 A1    May 26, 2005

Related U.S. Application Data

(60) Provisional application No. 60/550,437, filed on Mar. 5, 2004, provisional application No. 60/513,365, filed on Oct. 21, 2003.

(51) Int. Cl.
| | |
|---|---|
| A01K 71/00 | (2006.01) |
| A01K 73/00 | (2006.01) |
| A01K 75/00 | (2006.01) |
| A43B 1/02 | (2006.01) |
| A61F 5/00 | (2006.01) |
| A61F 13/00 | (2006.01) |
| A61F 15/00 | (2006.01) |
| B01J 19/24 | (2006.01) |
| B32B 3/02 | (2006.01) |
| C04B 24/26 | (2006.01) |
| C08F 8/00 | (2006.01) |
| C08F 242/00 | (2006.01) |
| C08G 18/42 | (2006.01) |
| C08G 63/48 | (2006.01) |
| C08G 63/91 | (2006.01) |
| C08J 3/00 | (2006.01) |
| C08L 3/20 | (2006.01) |
| C08L 33/00 | (2006.01) |
| C08L 51/00 | (2006.01) |
| C08L 67/00 | (2006.01) |
| C08L 67/02 | (2006.01) |
| D02G 3/02 | (2006.01) |
| D02G 3/36 | (2006.01) |
| D03D 27/00 | (2006.01) |
| D03D 9/00 | (2006.01) |
| D03D 15/00 | (2006.01) |
| D04H 1/08 | (2006.01) |
| D04H 11/00 | (2006.01) |
| D05C 17/00 | (2006.01) |
| D21F 11/00 | (2006.01) |
| D21H 11/00 | (2006.01) |
| E04B 1/00 | (2006.01) |
| E04G 21/00 | (2006.01) |
| E04G 23/00 | (2006.01) |

(52) U.S. Cl. ............... 525/190; 36/84; 43/7; 52/746.11; 57/255; 162/157.4; 162/164.1; 428/97; 442/49; 442/199; 442/324; 524/513; 524/539; 525/52; 525/55; 525/165; 525/176; 602/1; 602/52; 604/358; D2/728; D2/896

(58) Field of Classification Search .................. 524/513, 524/539; 525/52, 55, 165, 176, 190; 43/7; 36/84; 52/746.11; 57/255; 162/157.4, 164.1; 428/97; 442/49, 199, 324; 602/1, 52; 604/358; D02/728, 896
See application file for complete search history.

(56) References Cited

U.S. PATENT DOCUMENTS

| | | |
|---|---|---|
| 4,281,079 A | 7/1981 | Baer |
| 4,609,710 A | 9/1986 | Iohara et al. |
| 5,997,765 A | 12/1999 | Furuta et al. |
| 6,165,610 A | 12/2000 | Moore et al. |

FOREIGN PATENT DOCUMENTS

| | | |
|---|---|---|
| EP | 0 035 796 B1 | 9/1981 |
| EP | 0 041 327 B1 | 12/1981 |
| EP | 0047 464 B2 | 3/1982 |
| EP | 0 080 274 B1 | 6/1983 |
| EP | 0 708 148 | 4/1996 |
| EP | 0 737 707 A2 | 10/1996 |
| JP | 62250223 | 10/1987 |
| JP | 01165626 | 8/1989 |
| JP | 02 274759 | 11/1990 |
| JP | 6257014 | 9/1994 |
| JP | 8231835 | 9/1996 |
| JP | 9077960 | 3/1997 |
| JP | 10 101909 | 4/1998 |
| JP | 2003 238786 | 8/2003 |
| WO | WO 96/00752 | 1/1996 |
| WO | WO 97/25459 | 7/1997 |
| WO | WO 02/083079 A1 | 8/2002 |
| WO | WO 02/102898 A1 | 12/2002 |
| WO | WO 03/082980 A1 | 10/2003 |

OTHER PUBLICATIONS

Brody, H., Orientation Suppression in Fibers Spun from Polymer Melt Blends, *Journal of Applied Polymer Science*, 1986, 31(8), 2753-68.
PCT International Search Report for International application No. PCT/US2004/035044, dated Mar. 30, 2005.

*Primary Examiner* — Patrick D Niland

(57) ABSTRACT

Disclosed are films, tapes, and melt-spun fibers prepared from a composition comprising (a) at least one polyester polymer and (b) from about 1 to 30 weight % of at least one ethylene copolymer such as ethylene/vinyl acetate dipolymers, ethylene/vinyl acetate terpolymers, ethylene/alkyl (meth)acrylate dipolymers, ethylene/alkyl (meth)acrylate terpolymers, functionalized ethylene copolymers, ethylene/acid copolymers, and salts thereof. The films, tapes and fibers exhibit improved tensile properties such as tensile strength and elongation at break compared to non-modified polyester compositions. Also disclosed are textiles and articles prepared from the fibers described.

56 Claims, No Drawings

ETHYLENE COPOLYMER MODIFIED ORIENTED POLYESTER FILMS, TAPES, FIBERS AND NONWOVEN TEXTILES This application claims the priority of provisional U.S. application Nos. 60/513,365 filed Oct. 21, 2003, and 60/550,437 filed Mar. 5, 2004, the entire disclosures of both are incorporated herein by reference.

FIELD OF THE INVENTION

This invention relates to films, tapes and fibers comprising or produced from blends of polyester modified with ethylene copolymers and to nonwoven textiles comprising or prepared from melt-spun fibers comprising the modified polyester.

BACKGROUND OF THE INVENTION

Oriented films comprising polyester may be formed from the molten polymer by a number of methods known in the art (for example, cast film extrusion or blown film extrusion). Films can be oriented in one direction by hot-drawing in the machine direction with a tensioning device, and annealing. Films can also be oriented in two directions (machine direction and transverse direction) by suitable tensioning devices. Oriented polyester films are useful for a wide variety of packaging applications.

Also, tapes may be prepared from extruded polyester films. Flat films can be extruded into a cooling water bath or onto chilled rolls for quenching. Alternatively, a tubular blown film can be extruded through an annular die and air-quenched. The quenched film is then knife-slit into tapes. The tapes are then stretched (i.e. uniaxially oriented) to several times their original length by hot-drawing in the machine direction with a tensioning device and annealing the stretched tapes having controlled widths (for example from about 1 cm to about 5 cm). Polyester tapes can be used in a number of applications. For example, tapes can be coated with a variety of appropriate adhesives to prepare adhesive tapes.

Fibers comprising polyester may be formed directly from the molten polymer by a number of methods known in the art, including melt-spinning, centrifugal spinning and melt-blowing. Melt-spun or melt-blown fibers can be used in nonwoven textiles suitable for applications such as carpet backing, agrotextiles and geotextiles.

Polyester fibers can be used in twines or ropes or to prepare yarns for carpets. Polyester yarns also can be woven or knitted into fabrics used in applications such as tarpaulins, liners, banners, sacking, carpet backing, agrotextiles and geotextiles.

It is desirable to provide oriented polyester films, tapes and fibers with improved mechanical properties such as tensile breaking load, tenacity (tensile breaking stress) and elongation at break.

To reduce the cost of stretched slit-film tapes it is desirable to reduce the denier (similar width but lower thickness) of the tape and/or increase the amount of inert filler such as $CaCO_3$ in the polyester formulation.

With conventional polyester compositions used in preparing films and fibers, it is rather difficult to achieve the above objectives. Higher stretch ratios and reduced denier can result in unacceptable loss of physical properties. Undesirable fibrillation of polyester tapes under high stretch ratios is desirably to be overcome.

Polyester fibers with improved mechanical properties have been prepared by adding small amounts of additives to polyester. See, for example, EP 80274B1, EP 35796B1, EP 41327B1, EP 47464B2, U.S. Pat. No. 6,165,610, and *Journal of Applied Polymer Science*, 1986, 31(8), 2753-68.

SUMMARY OF THE INVENTION

The invention comprises film that comprises or is produced from a composition comprising or produced from (a) at least one polyester polymer and (b) from 1 to 30 weight % of at least one ethylene/alkyl acrylate copolymer.

DETAILED DESCRIPTION OF THE INVENTION

The invention stretched polyester films or tapes having desired mechanical properties such as tensile breaking load, tenacity (tensile breaking stress) and elongation at break (%) or melt spun polyester fibers having tenacity and elongation at break (%). These enhancements can be achieved by incorporating a small percentage (from about 1 to about 30, alternatively from 1 to about 15 weight %) of an ethylene copolymer such as ethylene/vinyl acetate dipolymers, ethylene/vinyl acetate terpolymers, ethylene/alkyl (meth)acrylate dipolymers, ethylene/alkyl (meth)acrylate terpolymers, functionalized ethylene copolymers, ethylene/acid copolymers, and salts thereof in the polyester formulations used to prepare the films and fibers (the polyester formulations may optionally contain other materials selected from fillers such as $CaCO_3$ and additives such as UV stabilizers, pigments etc.). Processability of polyester resin can be improved by increasing the melt strength of molten polyester resin by blending ethylene copolymers with polyester. These blends can provide improved stretchability for films and fibers over conventional polyester films and fibers as well as the drawability of tapes prepared during manufacturing (i.e. the blends can allow increased draw ratios with no or reduced tape fibrillation).

A preferred embodiment is a film prepared from a composition comprising or produced from (a) at least one polyester polymer and (b) from 1 to 30 weight % of at least one ethylene/alkyl acrylate copolymer. The ethylene/alkyl acrylate copolymer can comprise from 1 to 30 weight % of at least one E/X/Y copolymer wherein E comprises ethylene; X is a monomer selected from the group consisting of vinyl acetate and alkyl (meth)acrylic esters; and Y is one or more additional comonomers selected from the group consisting of carbon monoxide; sulfur dioxide; acrylonitrile; maleic anhydride; maleic acid diesters; (meth)acrylic acid, maleic acid, maleic acid monoesters, itaconic acid, fumaric acid, fumaric acid monoester, and salts thereof; glycidyl acrylate, glycidyl methacrylate, and glycidyl vinyl ether; wherein X is from 0 to 50 weight % of the E/X/Y copolymer, Y is from 0 to 35 weight % of the E/X/Y copolymer, wherein the weight % of X and Y cannot both be 0, and E being the remainder.

This invention also provides a slit film tape prepared from the film.

This invention further provides a melt-spun fiber comprising or prepared from a composition comprising (a) at least one polyester polymer and (b) from 1 to 15 weight % of at least one E/X/Y copolymer in which E, X, and Y can be the same as disclosed above.

Also a preferred embodiment is a melt-spun fiber comprising or prepared from a composition comprising (a) at least one polyester polymer and (b) from 1 to 15 weight % of at least one ethylene/alkyl acrylate copolymer disclosed above.

Further provided is nonwoven textiles comprising or prepared from melt-spun fibers as described above.

This invention also provides films, slit film tapes, fibers (e.g. melt-spun fibers) and nonwoven textiles wherein the composition described above further comprises (c) from 0.01 to 20 weight % of at least one additional component selected from the group consisting of fillers, delustrants, thermal and ultraviolet stabilizers, ultraviolet absorbers, antistatic agents, terminating agents, fluorescent whitening agents, pigments and other additives.

All references disclosed herein are incorporated by reference.

Thermoplastic compositions are polymeric materials that can flow when heated under pressure. Melt index (MI) is the mass rate of flow of a polymer through a specified capillary under controlled conditions of temperature and pressure. Melt indices reported herein are determined according to ASTM 1238 at 190° C. using a 2160 g weight, with values of MI reported in grams/10 minutes.

As indicated above, the films, tapes and fibers of this invention are prepared from a composition comprising polyester resins modified with ethylene copolymers.

Polyester polymer resins include polymers derived from condensation of diols and diacids (or derivatives thereof) that are suitable for forming films or fibers. Of note are polyesters comprising an aromatic dicarboxylic acid as the main acid component. Examples include polyethylene terephthalate, polytetramethylene terephthalate, polycyclohexane-dimethylene terephthalate and polyethylene-2,6-naphthalene dicarboxylate. These polyesters may also be copolymers copolymerized with either another alcohol or another dicarboxylic acid such as isophthalic acid or 5-sodium sulfoisophthalate as a third component. Mixtures of two or more of these polyesters also may be used. The term "polyester" when used herein is used generically to refer to any or all of the polymers described above. A particularly preferred polyester is polyethylene terephthalate (abbreviated PET). Polyesters and methods to prepare them are well known in the art. Preferably, the polyesters used herein have an intrinsic viscosity (IV) of between 0.5 and 1.1 (determined using an 8% solution in ochlorophenol at a temperature of 25° C.).

Ethylene copolymers used as polyester modifiers as described herein include ethylene/vinyl acetate dipolymers, ethylene/vinyl acetate terpolymers, ethylene/alkyl (meth) acrylate dipolymers, ethylene/alkyl (meth)acrylate terpolymers, functionalized ethylene copolymers, ethylene/acid copolymers, and salts thereof.

As indicated above, these ethylene copolymers can be defined as E/X/Y copolymers wherein E comprises ethylene, X is a comonomer selected from the group consisting of vinyl acetate, alkyl (meth)acrylic esters; and Y is one or more additional comonomers.

The term "ethylene/vinyl acetate dipolymers" includes copolymers derived from the copolymerization of ethylene and vinyl acetate.

The term "ethylene/vinyl acetate terpolymers" includes copolymers derived from the copolymerization of ethylene, vinyl acetate and an additional comonomer.

The relative amount of the vinyl acetate comonomer incorporated into ethylene/vinyl acetate copolymers can, in principle, vary broadly from a few weight % up to as high as 40 weight % of the total copolymer or even higher.

The term "(meth)acrylic acid," and the abbreviation "(M)AA," means methacrylic acid and/or acrylic acid. Likewise, the terms "(meth)acrylate" and "alkyl (meth)acrylate" means esters of methacrylic acid and/or acrylic acid, preferably wherein the alkyl moiety contains from one to six carbon atoms. Examples of alkyl acrylates include methyl acrylate (abbreviated MA), ethyl acrylate (abbreviated EA) and butyl acrylate (abbreviated BA).

The term "ethylene/alkyl (meth)acrylate dipolymers" includes copolymers derived from the copolymerization of ethylene and an alkyl (meth)acrylate.

The term "ethylene/alkyl (meth)acrylate terpolymers" includes copolymers derived from the copolymerization of ethylene, an alkyl (meth)acrylate and an additional comonomer.

The relative amount of the alkyl acrylate comonomer incorporated into ethylene/alkyl acrylate copolymers can vary broadly from a few weight % up to as high as 40 weight % of the total copolymer or even higher. Similarly, the choice of the alkyl group can, again in principle, vary from a simple methyl group up to a six-carbon atom alkyl group with or without significant branching. The relative amount and choice of the alkyl group present in the alkyl acrylate ester comonomer can be viewed as contributing to how and to what degree the resulting copolymer is to be viewed as a polar polymeric constituent in the thermoplastic composition.

Preferably, the alkyl group in the alkyl acrylate comonomer has from one to four carbon atoms and the alkyl acrylate comonomer has a concentration range of from 5 to 30, preferably from 10 to 25 weight % of the terpolymer. Most preferably, the alkyl group in the alkyl acrylate comonomer is methyl.

In addition to the contribution of the X comonomer to the polarity of the polymeric composition, the relative amount and choice of the Y comonomer(s) present in the ethylene copolymer can be viewed as contributing to how and to what degree the resulting copolymer is to be viewed as a polar polymeric constituent in the thermoplastic composition. As indicated above, the Y comonomer may also provide functionality to the ethylene copolymer (to form a functionalized ethylene copolymer) in addition to its contribution to the overall polarity of the copolymer.

Useful Y can be acrylic acid or methacrylic acid. Copolymers of an olefin such as ethylene and an unsaturated carboxylic acid, such as acrylic acid or methacrylic acid are, in the context of this invention, referred to as ethylene/acid copolymers. For example, "ethylene/(meth)acrylic acid (abbreviated E/(M)M)" means a copolymer of ethylene (abbreviated E)/acrylic acid (abbreviated AA) and/or methacrylic acid (abbreviated MAA). Ethylene/acid copolymers useful in this invention include E/(M)AA dipolymers having from about 2 to about 30 weight % (M)M. These copolymers can be defined in the context of this invention as an E/X/Y copolymer wherein the weight % of X is 0 and Y is acrylic acid or methacrylic acid with a weight % of from about 2 to about 30 weight %, the remainder being ethylene.

Ethylene/acid copolymers may also be terpolymers containing additional comonomers selected from alkyl (meth)acrylates. These acid terpolymers, when the alpha olefin is ethylene, can be described as E/X/Y copolymers wherein E is ethylene, X is selected from the group consisting of $C_1$ to $C_8$ alkyl acrylate or methacrylate esters and Y is acrylic acid or methacrylic acid. X and Y can be present in a wide range of percentages, X typically up to about 50 weight % of the terpolymer and Y typically up to about 35 weight % of the polymer. These ethylene/acid terpolymers include, for example, ethylene/n-butyl(meth)acrylate/(meth)acrylic acid terpolymers, ethylene Aso-butyl(meth)acrylate/(meth)acrylic acid terpolymers, ethylene/methyl(meth)acrylate/(meth)acrylic acid terpolymers, and ethylene/ethyl(meth)acrylate/(meth)acrylic acid/terpolymers.

Ethylene/acid copolymers as described above may be at least partially neutralized into metal salts. At least one alkali metal, transition metal, or alkaline earth metal cation, such as lithium, sodium, potassium, magnesium, calcium, or zinc, or a combination of such cations, is used to neutralize some portion of the acidic groups in the copolymer resulting in a thermoplastic resin exhibiting enhanced properties. These neutralized acid copolymers are commonly referred to as ionomeric resins ("ionomers").

Ionomers useful in this invention can include those prepared from E/(M)AA dipolymers having from about 2 to about 30 weight % (M)M. These copolymers can be defined in the context of this invention as an E/X/Y copolymer wherein the weight % of X is 0 and Y is acrylic acid or methacrylic acid with a weight % of from about 2 to about 30 weight %, the remainder being ethylene, at least partially neutralized by at least one of the alkali metal, alkaline earth metal or transition metal cations. Cations are selected from the group consisting of lithium*, sodium*, potassium, magnesium*, calcium, barium, lead, tin, or zinc* (* indicates a preferred cation), or a combination of such cations.

Various ionomeric resins are sold by E. I. du Pont de Nemours and Company (DuPont), Wilmington, Del., under the trademark "Surlyn®" and by the Exxon Corporation under the trademark "Escor®" and the tradename "lotek."

The term "functionalized ethylene copolymers" as used herein denotes copolymers of ethylene that incorporate reactive functional groups such as anhydrides and epoxides that can react with other components by, for example, covalent bonding.

Also suitable as Y components in the E/X/Y copolymers useful in this invention are maleic diesters or monoesters (maleic half-esters) including esters of $C_1$-$C_4$ alcohols, such as, for example, methyl, ethyl, n-propyl, isopropyl, and n-butyl alcohols. Preferably the ethylene/maleate copolymer includes maleic anhydride. Also preferably the ethylene/maleate copolymer includes maleic acid half-esters.

Maleic anhydride-grafted ethylene copolymers (maleated polyethylene) are those wherein ethylene copolymers such as polyethylenes are treated with maleic anhydride are known in the art as compatiblizers. Grafted E/X/Y copolymers as described herein include copolymers wherein a portion of the E component comprises an alpha-olefin other than ethylene, such as butene, hexene or octane, to modify the density of the copolymer. An example of a maleic anhydride modified linear high-density polyethylene is a product sold under the trademark Polybond® 3009 available from Crompton Corporation. Similar maleated polyolefins are sold under the trademark Fusabond® available from DuPont. Preferred grafted E/X/Y copolymers are those wherein maleic anhydride is incorporated in a range from about 0.3 to about 2 weight %.

Ethylene copolymers that include reactive functional groups such as maleic anhydride can also be readily obtained by a high-pressure free radical process. A high-pressure process suitable for use in preparing such copolymers is disclosed, for example, in U.S. Pat. No. 4,351,931. This eliminates the secondary process step of grafting traditionally used to create maleic anhydride-functionalized polymers. In addition, it is easier to obtain maleic anhydride incorporation to levels greater than 2 weight % using this process than by grafting. Preferred copolymers prepared from ethylene and a functional comonomer prepared by this process are those wherein the copolymer comprises from about 3 weight % to about 15 weight % of the functional comonomer. Of note are copolymers such as ethylene/maleic anhydride (E/MAH) or ethylene/ethyl hydrogen maleate (also known as ethylene/maleic acid monoester, or E/MAME) copolymer, which are synthesized directly in high-pressure autoclaves.

Also suitable Y can be epoxy-functionalized ethylene comonomers such as glycidyl acrylate, glycidyl methacrylate, or glycidyl vinyl ether (i.e. comonomers containing moieties derived from 2,3-epoxy-1-propanol).

Preferred epoxy-functionalized copolymers may be represented by the formula: E/X/Y, where E is the copolymer unit —(CH$_2$CH$_2$)— derived from ethylene; X is the copolymer unit —(CH$_2$CR$^1$R$^2$)—, where R$^1$ is hydrogen or methyl, and R$^2$ is carboalkoxy of 1 to 10 carbon atoms (X for example is derived from alkyl acrylates, alkyl methacrylates) or acetyloxy; and Y is the copolymer unit —(CH$_2$CR$^3$R$^4$)—, where R$^3$ is hydrogen or methyl and R$^4$ is carboglycidoxy or glycidoxy (Y for example is derived from glycidyl acrylate, glycidyl methacrylate, or glycidyl vinyl ether).

Preferred E/X/Y copolymers are those wherein X is 5 to 50 weight % of said E/X/Y copolymer, Y is 0.3 to 15 weight % of said E/X/Y copolymer, E being the remainder.

More preferably, the comonomer containing the glycidyl moiety (e.g., glycidyl acrylate or glycidyl methacrylate) is about 0.3 (or about 0.5) weight % to about 8 (or about 10 or about 12) weight % and the alkyl acrylate is from about 5 to about 40 (preferably about 20 to about 40 or about 25 to about 35) weight % of the total weight of the epoxy-functionalized ethylene copolymer.

Of note are copolymers such as ethylene/methyl acrylate/glycidyl methacrylate (E/MA/GMA), ethylene/ethyl acrylate/glycidyl methacrylate (E/EA/GMA) and ethylene/n-butyl acrylate/glycidyl methacrylate (E/n-BA/GMA).

It is also preferred that the epoxide-containing monomers, and more preferably the glycidyl-containing monomers, are incorporated into the reactant copolymer by the concurrent reaction of monomers and are not grafted onto a polymer by graft polymerization.

Also suitable Y can be comonomers such as carbon monoxide, sulfur dioxide, acrylonitrile, or combinations of two or more thereof. Of note are terpolymers such as ethylene/methyl acrylate/carbon monoxide (E/MA/CO), ethylene/ethyl acrylate/carbon monoxide (E/EA/CO) and ethylene/n-butyl acrylate/carbon monoxide (E/n-BA/CO), and ethylene/vinyl acetate/carbon monoxide (E/VA/CO).

The term "ethylene/alkyl acrylate copolymers" includes copolymers of ethylene and alkyl acrylates wherein the alkyl moiety contains from one to six carbon atoms. Examples of alkyl acrylates include methyl acrylate, ethyl acrylate and butyl acrylate. "Ethylene/methyl acrylate (abbreviated EMA)" means a copolymer of ethylene (abbreviated E) and methyl acrylate (abbreviated MA). "Ethylene/ethyl acrylate (abbreviated EEA)" means a copolymer of ethylene (abbreviated E) and ethyl acrylate (abbreviated EA). "Ethylene/butyl acrylate (abbreviated EBA)" means a copolymer of ethylene (abbreviated E) and butylacrylate (abbreviated BA).

The relative amount of the alkyl acrylate comonomer incorporated into ethylene/alkyl acrylate copolymers can vary broadly from a few weight % up to as high as 40 weight % of the total copolymer or even higher. Similarly, the choice of the alkyl group can, again in principle, vary from a simple methyl group up to a six-carbon atom alkyl group with or without significant branching. The relative amount and choice of the alkyl group present in the alkyl acrylate ester comonomer can be viewed as establishing how and to what degree the resulting ethylene copolymer is to be viewed as a polar polymeric constituent in the thermoplastic composition.

Preferably, the alkyl group in the alkyl acrylate comonomer can have one to four carbon atoms and the alkyl acrylate comonomer can have a concentration range of from 5 to 40 weight % (alternatively 30 weight %) of the ethylene/alkyl acrylate copolymer, preferably from 10 to 35 weight % (alternatively 25 weight %). Most preferably, the alkyl group in the alkyl acrylate comonomer is methyl.

Ethylene/alkyl acrylate copolymers can be prepared by processes well known in the polymer art using either autoclave or tubular reactors. The copolymerization can be run as a continuous process in an autoclave: ethylene, the alkyl acrylate, and optionally a solvent such as methanol (see U.S. Pat. No. 5,028,674) are fed continuously into a stirred autoclave of the type disclosed in U.S. Pat. No. 2,897,183, together with an initiator. The rate of addition can depend on variables such as the polymerization temperature, pressure, alkyl acrylate monomer employed, and concentration of the monomer in the reaction mixture needed to achieve the target composition of the copolymer. In some cases, it may be desirable to use a telogen such as propane, to control the molecular weight. The reaction mixture is continuously removed from the autoclave. After the reaction mixture leaves the reaction vessel, the copolymer is separated from the unreacted monomers and solvent (if solvent was used) by conventional means, e.g., vaporizing the nonpolymerized materials and solvent under reduced pressure and at an elevated temperature.

Tubular reactor produced ethylene/alkyl acrylate copolymer can be distinguished from the more conventional autoclave produced ethylene/alkyl acrylate as generally known in the art. Thus the term or phrase "tubular reactor produced" ethylene/alkyl acrylate copolymer, for purposes of this invention, denotes an ethylene copolymer produced at high pressure and elevated temperature in a tubular reactor or the like, wherein the inherent consequences of dissimilar reaction kinetics for the respective ethylene and alkyl acrylate comonomers is alleviated or partially compensated by the intentional introduction of the monomers along the reaction flow path within the tubular reactor. As generally recognized in the art, such a tubular reactor copolymerization technique can produce a copolymer having a greater relative degree of heterogeneity along the polymer backbone (a more blocky distribution of comonomers), can tend to reduce the presence of long chain branching and can produce a copolymer characterized by a higher melting point than one produced at the same comonomer ratio in a high pressure stirred autoclave reactor. Tubular reactor produced ethylene/alkyl acrylate copolymers are generally stiffer and more elastic than autoclave produced ethylene/alkyl acrylate copolymers.

Tubular reactor produced ethylene/alkyl acrylate copolymers of this nature are commercially available from DuPont.

The actual manufacturing of the tubular reactor ethylene/alkyl acrylate copolymers as previously stated is preferably in a high pressure, tubular reactor at elevated temperature with additional introduction of reactant comonomer along the tube and not merely manufactured in a stirred high-temperature and high-pressure autoclave type reactor. However, similar ethylene/alkyl acrylate copolymeric material can be produced in a series of autoclave reactors wherein comonomer replacement is achieved by multiple zone introduction of reactant comonomer as taught in U.S. Pat. Nos. 3,350,372; 3,756,996; and 5,532,066, and as such these high melting point materials can be considered equivalent for purposes of this invention.

To further illustrate and characterize the tubular reactor produced ethylene/alkyl acrylate copolymer relative to conventional autoclave produced copolymer, the following list of commercially available ethylene/methyl acrylate copolymers with associated melting point data show that tubular EMA resins have considerably higher melting points versus autoclave EMA's due to a very different MA distribution along polymer chains:

Autoclave Produced Copolymers
EMA-A1 (21.5 wt % MA) mp=76° C.
EMA-A2 (24 wt % MA) mp=69 ° C.
EMA-A3 (20 wt % MA) mp=80° C.
EMA-A4 (24 wt % MA) mp=73° C.
Tubular Reactor Produced Copolymers
EMA-T1 (25 wt % MA) mp=88° C.
EMA-T2 (20 wt % MA) mp=95° C.

For additional discussion regarding the differences between tubular reactor produced and autoclave produced ethylene/alkyl acrylate copolymers, see Richard T. Chou, Mimi Y. Keating and Lester J. Hughes, "High Flexibility EMA made from High Pressure Tubular Process", Annual Technical Conference—Society of Plastics Engineers (2002), $60^{th}$(Vol. 2), 1832-1836. CODEN: ACPED4 ISSN: 0272-5223; AN 2002:572809; CAPLUS.

See Table A for specific examples of tubular reactor produced ethylene/alkyl acrylate copolymers suitable for use in this invention that are available from DuPont.

TABLE A

| Ethylene Alkyl Acrylate Copolymer | Alkyl acrylate wt % | Melt Flow (g/10 min) |
|---|---|---|
| EMA | 25 | 0.4 |
| EMA | 25 | 0.6 |
| EMA | 9 | 2 |
| EMA | 14 | 2 |
| EMA | 18 | 2 |
| EMA | 24 | 2 |
| EMA | 9 | 6 |
| EMA | 20 | 8 |
| EMA | 13 | 9 |
| EMA | 30 | 3 |
| EEA | 12 | 1 |
| EEA | 16 | 1 |
| EEA | 15 | 6 |
| EEA | 15 | 7 |
| EBA | 7 | 1.1 |
| EBA | 7 | 1.1 |
| EBA | 17 | 1.5 |
| EBA | 17 | 1.8 |
| EBA | 27 | 4 |
| EBA | 17 | 7 |
| EBA | 35 | 1 |

The ethylene/alkyl acrylate copolymers useful in the present invention can vary significantly in molecular weight as witnessed by EMA having a melt index numerically in terms of a fraction up to about ten. The specific selection of the grade of ethylene/alkyl acrylate copolymer component(s) to be used to modify polyester can be influenced by balancing factors such as melt indices of the modifier and the polyester, draw temperature related to the respective softening points of the ethylene/alkyl acrylate copolymer and the polyester, and the draw profile (draw rate and draw ratio) contemplated. Other factors to be considered in the selection of the ethylene/alkyl acrylate copolymer include increased elastic recovery associated with higher relative molecular weight copolymer (such as an E/25 weight % MA with a 0.7 MI) and the pragmatic ability to more easily blend with fillers (see below) with a relatively lower molecular copolymer (such as an E/20 weight % MA with an 8 MI).

The compositions useful in this invention may optionally further comprise fillers such as $CaCO_3$, and other additives such as delustrants such as $TiO_2$, thermal and ultraviolet (UV) stabilizers, UV absorbers, antistatic agents, terminating agents, fluorescent whitening agents, pigments, etc. These additives are well known in the art of polyester films and melt spun fibers. These conventional ingredients may be present in the compositions according to this invention in quantities that are generally from 0.01 to 20 weight %, preferably from 0.1 to 15 weight %.

The optional incorporation of such conventional ingredients into the compositions comprising polyester modified with an ethylene copolymer can be carried out by any known process. This incorporation can be carried out, for example, by dry blending, by extruding a mixture of the various constituents, by the conventional master batch technique, or the like. A typical master batch may comprise from 75 to 90 weight % of $CaCO_3$. Of note is the use of a master batch comprising $CaCO_3$ and the ethylene copolymer modifier.

The mechanical properties such as tenacity, tensile breaking load, elongation at break and denier of the films, tapes and fibers of this invention can be balanced by adjusting various parameters including
  resin formulation design (base resin, level and types of additives such as $CaCO_3$, UV stabilizers, pigment added);
  amount and type of ethylene copolymer used;
  processing equipment (quenching, slitting, drawing and annealing configuration); and
  processing conditions (extruder screw configuration, temperature profile and polymer throughput, stretch and annealing temperatures and profiles, line speed, etc).

Typically, a manufacturing facility for preparing films or fibers can have a limited ability to modify equipment and processing conditions. Therefore, ethylene copolymer modification of the polyester resin as described herein can provide significant improvement in mechanical properties of the polyester films, tapes and fibers prepared.

The thermoplastic compositions described herein are suitable for preparation of films and fibers by extrusion processing.

This invention provides a film prepared from a composition comprising polyester and ethylene copolymers. The film can be unoriented, oriented in a uniaxial direction (e.g. machine direction), or oriented in a biaxial direction (e.g. machine direction and transverse direction).

The films are useful in a wide variety of packaging applications including shrink film. As indicated above, the films are also useful for preparing slit film tapes.

Films of this invention can be made by virtually any method of film forming known to those skilled in this art. For the purposes of the present invention, the film, in principle, can be either a single layer or multilayer polymeric film. As such, the film and film structures can be typically cast, extruded, co-extruded and the like including orientation (either uniaxially or biaxially) by various methodologies (e.g., blown film, mechanical stretching or the like). Various additives as generally practiced in the art can be present in the respective film layers including the presence of tie layers and the like, provided their presence does not substantially alter the properties of the film or film structure. Thus, it is contemplated that various additives such as antioxidants and thermal stabilizers, ultraviolet (UV) light stabilizers, pigments and dyes, fillers, delustrants, anti-slip agents, plasticizers, other processing aids, and the like may be advantageously employed.

The manufacture of a film of this invention from the compositions described above can be carried out according to any known methods. It is possible, for example, to manufacture a primary film by extruding the said compositions using so-called "blown film" or "flat die" methods. A blown film is prepared by extruding the polymeric composition through an annular die and expanding the resulting tubular film with an air current to provide a blown film. Cast flat films are prepared by extruding the composition through a flat die. The film leaving the die is cooled by at least one roll containing internally circulating fluid (a chill roll) or by a water bath to provide a cast film. A film of this invention would have a width, for example, of about 60 cm (two feet).

A film of the present invention can be further oriented beyond the immediate quenching or casting of the film. The process comprises the steps of extruding a laminar flow of molten polymer, quenching the extrudate and orienting the quenched extrudate in at least one direction. "Quenched" as the term is used herein describes an extrudate that has been substantially cooled below its melting point in order to obtain a solid film material.

The film may be uniaxially oriented, but is preferably biaxially oriented by drawing in two mutually perpendicular directions in the plane of the film to achieve a satisfactory combination of mechanical and physical properties.

Orientation and stretching apparatus to uniaxially or biaxially stretch film are known in the art and may be adapted by those skilled in the art to produce films of the present invention. Examples of such apparatus and processes include, for example, those disclosed in U.S. Pat. Nos. 3,278,663; 3,337,665; 3,456,044; 4,590,106; 4,760,116; 4,769,421; 4,797,235 and 4,886,634.

A blown film of the present invention may be oriented using a double bubble extrusion process, where simultaneous biaxial orientation may be effected by extruding a primary tube which is subsequently quenched, reheated and then expanded by internal gas pressure to induce transverse orientation, and drawn by differential speed nip or conveying rollers at a rate which can induce longitudinal orientation.

The processing to obtain an oriented blown film is known in the art as a double bubble technique, and can be carried out as described by Pahlke in U.S. Pat. No. 3,456,044. More particularly, a primary tube is melt extruded from an annular die. This extruded primary tube is cooled quickly to minimize crystallization. It is then heated to its orientation temperature (for example, by means of a water bath). In the orientation zone of the film fabrication unit a secondary tube is formed by inflation, thereby the film is radially expanded in the transverse direction and pulled or stretched in the machine direction at a temperature such that expansion occurs in both directions, preferably simultaneously; the expansion of the tubing being accompanied by a sharp, sudden reduction of thickness at the draw point. The tubular film is then again flattened through nip rolls. The film can be reinflated and passed through an annealing step (thermofixation), during which step it is heated once more to adjust the shrink properties.

In one embodiment, the film is formed by an extrusion process that causes the polymer chains in the film to be generally aligned in the direction of extrusion. Linear polymers, after being highly oriented uniaxially possess considerable strength in the orientation direction, but less strength in the transverse direction. This alignment can add strength to the film in the direction of extrusion, which corresponds to the length dimension of the slit film yarns. Alternatively, the film may be formed through a blowing process known to those skilled in this art.

Preferred films of this invention include:

Preferred 1. The film wherein said alkyl acrylate is present in said ethylene/alkyl acrylate copolymer in a range from about 5 to about 40 weight % (alternatively 30 weight %).

Preferred 2. The film of Preferred 1 wherein said alkyl acrylate is present in said ethylene/ alkyl acrylate copolymer in a range from about 10 to about 35 weight % (alternatively 25 weight %).

Preferred 3. The film of Preferred 2 wherein said alkyl acrylate is selected from the group consisting of methyl acrylate, ethyl acrylate and butyl acrylate.

Preferred 4. The film of Preferred 3 wherein said alkyl acrylate is methyl acrylate.

Preferred 5. The film of any of Preferred 1 through Preferred 4 wherein component (b) is present in an amount from 5 to 15 weight %.

Preferred 6. The film of any of Preferred 1 through Preferred 5 further comprising (c) from 0.01 to 20 weight % of at least one additional component selected from the group consisting of fillers, delustrants, thermal and ultraviolet stabilizers, ultraviolet absorbers, antistatic agents, terminating agents, fluorescent whitening agents, pigments and other additives.

Preferred 7. The film of Preferred 6 wherein component (c) is present in an amount between 0.1 and 15 weight %.

Preferred 8. The film of any of Preferred 1 through Preferred 7 that is prepared by extrusion of said composition into a cooling water bath for quenching.

Preferred 9. The film of any of Preferred 1 through Preferred 7 that is prepared by extrusion of said composition onto chilled rolls for quenching.

Preferred 10. The film of any of Preferred 1 through Preferred 7 that is prepared by extrusion of said composition through an annular die into a tubular blown film that is air-quenched.

Preferred 11. The film of any of Preferred 1 through Preferred 10 wherein said composition comprises a tubular reactor produced ethylene/alkyl acrylate copolymer.

This invention also provides a slit film tape prepared from films of this invention. Preferred tapes are those prepared from the preferred films above.

A primary nonoriented film can be slit into slit film tapes that are drawn before being reeled up. The slit film tapes can be produced with a slitting apparatus which comprises a support frame; a plurality of substantially planar cutting blades, each of which includes opposed cutting edges and opposed ends; a mounting structure for mounting the cutting blades to the support frame; and a feed roll attached to the support frame and configured to feed film in a downstream direction over the exposed cutting edges of the blades. The mounting structure is configured to mount the cutting blades in substantially aligned, parallel and spaced apart relationship, wherein the blades are mounted such that each blade has one of its cutting edges exposed for cutting, and wherein the cutting edges of adjacent blades are spaced apart from each other.

After slitting the film into tapes as described above, the drawing operation would be done over a span of from 3 to 6 meters (ten to twenty feet) in an oven heated to a temperature effective to soften the film so as to facilitate the drawing operation. What typically takes place is that the film, at the beginning of the path through the oven is cold and is progressively heated and softened as it passes through the oven. Necking takes place at a neckline that is at a certain distance from the entrance to the oven. The location of the necking zone depends on a number of factors including the rate of stretching, the temperature of the oven, and the nature and thickness of the film material. A typical pre-stretched tape may have, for example, a thickness about 120 microns and a width of about 3 cm to about 15 cm. After stretching, the final tape has a thickness of about 30 to 50 microns and a width of about 1 cm to about 5 cm. Tapes can be made wider or narrower for certain purposes.

The drawing ratio can generally be in the range of from about 2:1 to about 16:1 and a typical drawing ratio for some compositions would be from about 4:1 to about 10:1. The distance over which longitudinal drawing takes place can vary with the technique used. In the short-draw the stretching takes place over a distance of a few inches, other techniques involve much greater distances.

As noted above, fibers may also be prepared directly from extrusion processes including centrifugal spinning, melt-spinning, spunbonding and melt-blowing.

In centrifugal spinning, fibers are formed as a polymer melt is accelerated from a rapidly rotating source. Molten material from a furnace is transferred into a rotating spinner, and the fibers are produced as centrifugal force extrudes the material through small holes in the side of the spinning device.

In melt spinning, the fiber-forming substance is melted for extrusion through a spinneret and then directly solidified by cooling. Melt spun fibers can be extruded from the spinneret in different cross-sectional shapes (round, trilobal, pentalobal, octalobal, and others). In-line drawing is effected by wrapping the moving threadline around sets of rotating rolls running at controlled temperature and speeds. Depending on the specific melt spinning process and subsequent processing steps, product can be collected as monofilaments, yarn, tow or nonwoven (e.g. spunbond). See *Fibers from Synthetic Polymers*, Rowland Hill, ed., Elsevier Publishing Co., NY, 1953 for a general reference regarding melt spun fibers.

Spun bonding is the direct laydown of nonwoven textile webs from fibers as they are melt-spun. Continuous filaments are extruded through a spinneret, accelerated (via rolls or jets) and laid down onto a moving belt to form a nonwoven sheet. Bonding occurs at molten fiber crossover points.

Melt blowing is another direct laydown process in which fibers are extruded through a die tip, attenuated (and fractured) by hot, high velocity air, and deposited onto a moving belt or screen to form a textile web of fine (low denier) fibers.

Both spunbond (S) and meltblown (M) textile webs, after being formed, can be further bonded and/or patterned by calendering. Multiple layered nonwovens (e.g. SMS, SMMS, SMMMS) can also be prepared from fibers of this invention.

This invention further provides a melt-spun fiber prepared from a composition as described above. Preferred melt-spun fibers include:

Preferred A. The fiber wherein said alkyl acrylate is present in said ethylene/alkyl acrylate copolymer in a range from about 5 to about 40 weight % (alternatively 30 weight %).

Preferred B. The fiber of Preferred A wherein said alkyl acrylate is present in said ethylene/alkyl acrylate copolymer in a range from about 10 to about 35 weight % (alternatively 25 weight %).

Preferred C. The fiber of Preferred B wherein said alkyl acrylate is selected from the group consisting of methyl acrylate, ethyl acrylate and butyl acrylate.

Preferred D. The fiber of Preferred C wherein said alkyl acrylate is methyl acrylate.

Preferred E. The fiber of any of Preferred A through Preferred D wherein component (b) is present in an amount from 5 to 10 weight %.

Preferred F. The fiber of any of Preferred A through Preferred E further comprising (c) from 0.01 to 15 weight % of at least one additional component selected from the group consisting of fillers, delustrants, thermal and ultraviolet stabilizers, ultraviolet absorbers, antistatic agents, terminating agents, fluorescent whitening agents, pigments and other additives.

Preferred G. The fiber of Preferred F wherein component (c) is present in an amount between 0.1 and 5 weight %.

Preferred H. The fiber of any of Preferred A through Preferred G wherein said composition comprises a tubular reactor produced ethylene/alkyl acrylate copolymer.

Nonwoven textiles can be prepared from melt-spun fibers as described above. Preferred nonwoven textiles are prepared from the preferred fibers above.

Woven or knitted textiles can be prepared from melt-spun fibers as described above. Preferred woven or knitted textiles are prepared from the preferred fibers above.

Oriented films are used in a wide variety of packaging applications. As described above, films of this invention can be also used to prepare slit tape fibers.

Fibers prepared as described herein, including slit tape fibers are useful for preparing cords, twines or ropes. A number of fibers are joined together by, for example, twisting, braiding, interlacing and the like to form a cord. Twines, in general, contain a lower number of fibers and are smaller in diameter than ropes. These cords, twines or ropes may be roughly circular or flattened in cross section. Cords and twines can be used for shoelaces, straps for bags, briefcases and the like, and can be used in packaging applications. Ropes can be used in a wide variety of industrial and marine applications. Cords, twines and ropes may also be further interlaced (such as by knitting) to prepare nets having a relatively open structure, such as fishing nets, cargo nets and the like.

Slit tape fibers of this invention can be used as monofilament fibers for carpet tufting, synthetic lawns, matting and the like. They can also be used as strapping. When an adhesive is applied they can be used as adhesive tapes for uses such as strapping, in furniture or bonding materials together.

Woven or knitted textiles can be prepared from the slit tape fibers or melt-spun fibers as described above. In general, woven fabrics may have a tighter construction than knitted fabrics. Polyester yarns prepared as described herein can be woven into fabrics used in applications such as filters, tarpaulins, sails, boat tops, covers, awnings, tents, escape slides, canopies, banners, construction (e.g. roofing) membranes, machine belts, liners for luggage or packaging, heavy duty sacking, carpet backing, book covers, footwear, upholstery for use in home furniture, motor vehicles, boats, aircraft and the like, apparel, agrotextiles (for use in seed control, weed control, gardening, greenhouses and silage) and geotextiles (for erosion control and soil conservation). Knitted fabrics can be used for sacking for use in carrying bulky materials such as groceries, firewood and the like; and construction and industrial netting.

Woven fabrics using the modified polyester compositions as described herein have a lower slip tendency, particularly for heavy duty sacks.

Nonwoven fabrics of this invention can be used in diapers and other items used for personal hygiene such as adult incontinence and feminine hygiene products, medical apparel such as hats, gowns, booties, personal protective equipment including masks and the like, hygiene protective furnishings such as drapes, covers, blankets and the like, packaging, durable paper, wipes, wraps, banners, carpet backing, geotextiles, agrotextiles, upholstery, apparel, filters, liners, construction wrap for heat and moisture control in buildings, or roofing membranes.

For carpet backings, the shrink of the textile is preferably, for example, shrinkage less than 2.5% at 45° C. Woven carpet backings are typically used as a primary backing for carpets to provide strength, dimensional stability and form to the carpet. They can be prepared from slit tape fibers of this invention.

Secondary carpet backings can be used to provide a substrate to which the carpet yarns are secured. They can be prepared from nonwoven materials. Melt spun fibers of this invention are useful for preparing nonwoven substrates useful as secondary carpet backing.

Geotextiles can be used in roads under the gravel and paving layers to improve road quality. Geotextile fabrics are typically manufactured by weaving polyester tapes having approximately 2.5 mm width. Geotextiles are also prepared from spun bonded nonwoven material derived from melt-spun fibers. Shrinkage requirements for geotextiles are not as stringent as those for carpet backings. However, resistance to perforation is preferred for geotextiles.

The following Examples are merely illustrative, and are not to be construed as limiting the scope of the invention.

EXAMPLES

Examples 1 and 2

Plaques were prepared to measure tensile properties of the polyester compositions in order to evaluate their stretchability at 180° C. (the temperature normally used to stretch PET compositions on industrial equipment to make fibers, slit tapes or bioriented film).

Materials Used

PET-1: PET homopolymer having inherent viscosity (IV) of 1.0 (high viscosity), DEG: 12000 mg/kg, acid end groups: 40 mg/kg, available from AKZO as BGDQ.

EMA-1: Ethylene/alkyl acrylate copolymer with 24 weight % methyl acrylate with MI of 2 g/10 min (ASTM D-1238, 190° C. using a 2.16 Kg mass).

Resin Formulations:

Comparative Example C1: PET-1 (100%)
Example 1: PET-1 (95%)+EMA-1 (5%)
Example 2: PET-1 (90%)+EMA-1 (10%)

Plaques were made on a Collin press by compression molding using the following conditions:

Preheating: 4 min. at 270° C. and at pressure of 10 bars
Heating: 2 min. at 270° C. and at pressure of 150 bars.
Plaque size: 150×150×2 mm Tensile properties were measured at 180° C. according to ASTM 1708 (20 measurements per blend).

TABLE 1

| Example | | Tensile strength (MPa) | Elongation at break (%) |
|---|---|---|---|
| C1 | 100% PET-1 | 15.9 | 80 |
| 1 | 95% PET-1 + 5% EMA-1 | 25.2 | 269 |
| 2 | 90% PET-1 + 10% EMA-1 | 25.9 | 272 |

These trial results confirmed that the addition of 5 to 10% of ethylene/alkyl acrylate copolymer in the polyester has improved the mechanical properties such as tensile strength and elongation to break of polyester compositions. Based on these results, we expect that stretchability on production equipment to make tapes, fibers or bioriented films can be highly enhanced.

Examples 3 and 4

Films were prepared from polyester compositions. Tapes were cut from the films and these were then drawn at elevated temperatures. The tensile properties were then evaluated at room temperature.

Materials Used

PET-2: PET homopolymer having inherent viscosity of 0.58, Available from DuPont as Crystar®.

Resin formulations

Comparative Examples C2 and C3: PET-2 (100%)
Examples 3 and 4: PET-2 (95%)+EMA-1 (5%)

Samples were mixed in a 28 mm twin-screw extruder, extruded through a coat-hanger die, and quench cast onto a chill roll to give a film 5 to 6 mil in thickness. One-quarter-inch-wide (6 mm) tapes were cut from the film in the machine direction. These tapes were then drawn in a tensile testing machine fitted with an oven maintained at 75° C., at a rate of 2,000% per minute to 4× and 6× the original length. Tensile properties were then measured by stretching at room temperature at 100% per minute and are reported in Table 2.

TABLE 2

| Example | Composition | Draw | Tensile Strength (MPa) | Elongation at Break (%) |
|---|---|---|---|---|
| C2 | 100% PET-2 | 4X | 310.3 | 79 |
| 3 | 95% PET-2 + 5% EMA-1 | 4X | 333.2 | 95 |
| C2 | 100% PET-2 | 6X | 488.7 | 21.8 |
| 4 | 95% PET-2 + 5% EMA-1 | 6X | 496.3 | 28.7 |

These results show improving the mechanical properties of films drawn at higher temperatures and tested at room temperature.

What is claimed is:

1. A film comprising or produced from a composition, which comprises or is produced from (a) at least one polyester polymer derived from condensation of diol and aromatic dicarboxylic acid and (b) from 1 to 30 weight % of at least one copolymer wherein
   the polyester is polyethylene terephthalate, polytetramethylene terephthalate, polycyclohexane-dimethylene terephthalate, or polyethylene-2,6-naphthalene dicarboxylate;
   the copolymer is an E/X/Y copolymer;
   E comprises ethylene;
   X is vinyl acetate or alkyl (meth)acrylate ester;
   Y is carbon monoxide, sulfur dioxide, acrylonitrile, maleic anhydride, maleic acid diester, (meth)acrylic acid, maleic acid, maleic acid monoester, itaconic acid, fumaric acid, fumaric acid monoester, a salt thereof, glycidyl acrylate, glycidyl methacrylate, glycidyl vinyl ether, or combinations of two or more thereof; X is present from 0 to 50 weight % of said E/X/Y copolymer; Y is present from 0 to 35 weight % of said E/X/Y copolymer; the weight % of X and Y cannot both be 0; and E being the remainder; and
   the film is an oriented film.

2. The film of claim 1 wherein said at least one copolymer is ethylene/alkyl acrylate copolymer.

3. The film of claim 2 wherein said alkyl acrylate is present in said ethylene/alkyl acrylate copolymer in a range from about 5 to about 40 weight %.

4. The film of claim 2 wherein said alkyl acrylate is present in said ethylene/alkyl acrylate copolymer in a range from about 10 to about 35 weight %.

5. The film of claim 4 wherein said alkyl acrylate is methyl acrylate, ethyl acrylate, butyl acrylate, or combinations of two or more thereof.

6. The film of claim 5 wherein said alkyl acrylate is methyl acrylate.

7. The film of claim 6 wherein said ethylene/alkyl acrylate copolymer is present in said composition from 5 to 10 weight %.

8. The film of claim 1 further comprising or produced from 0.01 to 20 weight % of at least one fillers, delustrants, thermal or ultraviolet stabilizers, ultraviolet absorbers, antistatic agents, terminating agents, fluorescent whitening agents, pigments or other additives.

9. The film of claim 8 wherein said at least one copolymer is present in said composition from 5 to 10 weight %.

10. The film of claim 8 wherein said at least one copolymer is ethylene/alkyl acrylate copolymer.

11. The film of claim 10 wherein component (c) is present in an amount of from 0.1 to 15 weight %.

12. The film of claim 7 being produced by extrusion of said composition into a cooling water bath for quenching.

13. The film of claim 11 being produced by extrusion of said composition into a cooling water bath for quenching.

14. The film of claim 7 being produced by extrusion of said composition onto chilled rolls for quenching.

15. The film of claim 11 being produced by extrusion of said composition onto chilled rolls for quenching.

16. The film of claim 11 being produced by extrusion of said composition through an annular die into a tubular blown film that is air-quenched.

17. The film of claim 1 wherein said at least one copolymer comprises a tubular reactor-produced ethylene/alkyl acrylate copolymer.

18. The film of claim 4 wherein said at least one copolymer comprises a tubular reactor-produced ethylene/alkyl acrylate copolymer.

19. The film of claim 11 wherein said at least one copolymer comprises a tubular reactor-produced ethylene/alkyl acrylate copolymer.

20. The film of claim 1 wherein the film is converted to a tape.

21. The film of claim 4 wherein the film is converted to a tape.

22. The film of claim 11 wherein the film is converted to a tape.

23. The film of claim 19 wherein the film is converted to a tape.

24. The film of claim 21 wherein the tape is converted to a fiber.

25. The film of claim 22 wherein the tape is converted to a fiber.

26. The film of claim 23 wherein the tape is converted to a fiber.

27. The fiber of claim 24 wherein the fiber is converted to textile.

28. The fiber of claim 25 wherein the fiber is converted to textile.

29. The fiber of claim 26 wherein the fiber is converted to textile.

30. An article prepared from the textile of claim 27.

31. The article of claim 30 comprising diaper, adult incontinence product, feminine hygiene product, medical apparel, personal protective equipment, hygiene protective furnishings, packaging, durable paper, wipe, wrap, banner, carpet backing, geotextile, agrotextile, upholstery, apparel, filter, liner, construction wrap, roofing membrane, tarpaulin, sail, boat top, cover, awning, tent, escape slide, canopy, banner, construction membrane, machine belt, liners for luggage or packaging, sacking, book cover, footwear, construction netting, industrial netting, cord, twine, rope, shoelace, strap, fishing net, cargo net, carpet tufting, synthetic lawns matting, strapping, or adhesive tape.

32. A melt-spun fiber comprising, or produced from, a composition, which comprises or is produced from (a) at least one polyester polymer and (b) from 1 to 15 weight % of at least one E/X/Y copolymer wherein the polyester is polyethylene terephthalate, polytetramethylene terephthalate, polycyclohexane-dimethylene terephthalate, or polyethylene-2,6-naphthalene dicarboxylate;

E comprises ethylene;

X is one or more vinyl acetate or alkyl (meth)acrylic esters; and

Y is one or more additional comonomers including carbon monoxide; sulfur dioxide; acrylonitrile; maleic anhydride; maleic acid diesters; (meth)acrylic acid, maleic acid, maleic acid monoesters, itaconic acid, fumaric acid, fumaric acid monoester, or salts thereof; glycidyl acrylate, glycidyl methacrylate, and glycidyl vinyl ether; X is from 0 to 50 weight % of said E/X/Y copolymer, Y is from 0 to 35 weight % of said E/X/Y copolymer, wherein the weight % of X and Y cannot both be 0, and E being the remainder.

33. The fiber of claim 32 wherein said at least one E/X/Y copolymer is ethylene/alkyl acrylate copolymer, which is present from about 1 to about 15 weight %, or about 5 to about 10 weight %, of said composition.

34. The fiber of claim 33 wherein said alkyl acrylate is present in said ethylene/alkyl acrylate copolymer in a range from about 10 to about 35 weight %.

35. The fiber of claim 34 wherein said alkyl acrylate is methyl acrylate, ethyl acrylate, butyl acrylate, or combinations of two or more thereof.

36. The fiber of claim 35 wherein said alkyl acrylate is methyl acrylate.

37. The fiber of claim 32 further comprising or produced from 0.01 to 20 weight % of component (c), which is at least one filler, delustrant, thermal or ultraviolet stabilizer, ultraviolet absorber, antistatic agent, terminating agent, fluorescent whitening agent, pigment, or other additive.

38. The fiber of claim 37 wherein said at least one E/X/Y copolymer is present in said composition from 5 to 10 weight %.

39. The fiber of claim 38 wherein said at least one E/X/Y copolymer is ethylene/alkyl acrylate copolymer.

40. The fiber of claim 39 wherein component (c) is present in an amount of from 0.1 to 15 weight %.

41. The fiber of claim 33 wherein said at least one E/X/Y copolymer comprises a tubular reactor-produced ethylene/alkyl acrylate copolymer.

42. The fiber of claim 36 wherein said at least one E/X/Y copolymer comprises a tubular reactor-produced ethylene/alkyl acrylate copolymer.

43. The fiber of claim 40 wherein said at least one E/X/Y copolymer comprises a tubular reactor-produced ethylene/alkyl acrylate copolymer.

44. The fiber of claim 33 wherein textile is produced from said fiber.

45. The fiber of claim 42 wherein textile is produced from said fiber.

46. The fiber of claim 34 wherein textile is produced from said fiber.

47. An article prepared from the textile produced in claim 44.

48. An article prepared from the textile produced in claim 45.

49. An article prepared from the textile produced in claim 46.

50. The article of claim 47 comprising diaper, adult incontinence product, feminine hygiene product, medical apparel, personal protective equipment, hygiene protective furnishings, packaging, durable paper, wipe, wrap, banner, carpet backing, geotextile, agrotextile, upholstery, apparel, filter, liner, construction wrap, roofing membrane, tarpaulin, sail, boat top, cover, awning, tent, escape slide, canopy, banner, construction membrane, machine belt, liners for luggage or packaging, sacking, book cover, footwear, construction netting, industrial netting, cord, twine, rope, shoelace, strap, fishing net, cargo net, carpet tufting, synthetic lawns matting, strapping, or adhesive tape.

51. The article of claim 48 comprising diaper, adult incontinence product, feminine hygiene product, medical apparel, personal protective equipment, hygiene protective furnishings, packaging, durable paper, wipe, wrap, banner, carpet backing, geotextile, agrotextile, upholstery, apparel, filter, liner, construction wrap, roofing membrane, tarpaulin, sail, boat top, cover, awning, tent, escape slide, canopy, banner, construction membrane, machine belt, liners for luggage or packaging, sacking, book cover, footwear, construction netting, industrial netting, cord, twine, rope, shoelace, strap, fishing net, cargo net, carpet tufting, synthetic lawns matting, strapping, or adhesive tape.

52. The article of claim 49 comprising diaper, adult incontinence product, feminine hygiene product, medical apparel, personal protective equipment, hygiene protective furnishings, packaging, durable paper, wipe, wrap, banner, carpet backing, geotextile, agrotextile, upholstery, apparel, filter, liner, construction wrap, roofing membrane, tarpaulin, sail, boat top, cover, awning, tent, escape slide, canopy, banner, construction membrane, machine belt, liners for luggage or packaging, sacking, book cover, footwear, construction netting, industrial netting, cord, twine, rope, shoelace, strap, fishing net, cargo net, carpet tufting, synthetic lawns matting, strapping, or adhesive tape.

53. An article prepared from the textile of claim 36.

54. An article prepared from the textile of claim 37.

55. The article of claim 53 comprising diaper, adult incontinence product, feminine hygiene product, medical apparel, personal protective equipment, hygiene protective furnishings, packaging, durable paper, wipe, wrap, banner, carpet backing, geotextile, agrotextile, upholstery, apparel, filter, liner, construction wrap, roofing membrane, tarpaulin, sail, boat top, cover, awning, tent, escape slide, canopy, banner, construction membrane, machine belt, liners for luggage or packaging, sacking, book cover, footwear, construction netting, industrial netting, cord, twine, rope, shoelace, strap, fishing net, cargo net, carpet tufting, synthetic lawns matting, strapping, or adhesive tape.

56. The article of claim 54 comprising diaper, adult incontinence product, feminine hygiene product, medical apparel, personal protective equipment, hygiene protective furnishings, packaging, durable paper, wipe, wrap, banner, carpet backing, geotextile, agrotextile, upholstery, apparel, filter, liner, construction wrap, roofing membrane, tarpaulin, sail, boat top, cover, awning, tent, escape slide, canopy, banner, construction membrane, machine belt, liners for luggage or packaging, sacking, book cover, footwear, construction netting, industrial netting, cord, twine, rope, shoelace, strap, fishing net, cargo net, carpet tufting, synthetic lawns matting, strapping, or adhesive tape.

* * * * *